United States Patent [19]
Pileri et al.

[11] Patent Number: 5,649,849
[45] Date of Patent: Jul. 22, 1997

[54] METHOD AND APPARATUS FOR REALTIME MONITORING AND FEEDBACK CONTROL OF THE SHAPE OF A CONTINUOUS PLANETARY POLISHING SURFACE

[75] Inventors: David Pileri, Fairport; John Hannon, Rochester; Donald A. Gildner, Rochester; Mark Baumler, Rochester, all of N.Y.

[73] Assignee: Eastman Kodak Company, Rochester, N.Y.

[21] Appl. No.: 410,457

[22] Filed: Mar. 24, 1995

[51] Int. Cl.⁶ .................................... B24B 49/00
[52] U.S. Cl. .................. 451/1; 451/5; 451/8; 451/285
[58] Field of Search ................... 451/1, 5, 8, 9, 451/285, 286, 287, 288, 289, 271, 41, 42, 10, 259

[56] References Cited

U.S. PATENT DOCUMENTS

| | | | |
|---|---|---|---|
| 2,627,144 | 2/1953 | Roshong | 451/286 |
| 2,782,571 | 2/1957 | Hanson | 451/286 |
| 2,971,298 | 2/1961 | Garthwaite et al. | 451/286 |
| 2,979,868 | 4/1961 | Emeis | 451/286 |
| 2,992,519 | 7/1961 | Pearson | 451/286 |
| 3,456,393 | 7/1969 | Barragan | 451/286 |
| 3,668,813 | 6/1972 | Barragan | 451/286 |
| 3,708,921 | 1/1973 | Gronkhite et al. | 451/41 |
| 4,169,980 | 10/1979 | Zanoni | 250/550 |
| 4,457,625 | 7/1984 | Greenleaf et al. | 356/360 |
| 4,460,275 | 7/1984 | Spriggs | 356/358 |
| 4,594,003 | 6/1986 | Sommargren | 356/349 |
| 4,618,262 | 10/1986 | Maydan et al. | 356/357 |
| 4,633,715 | 1/1987 | Monchalin | 73/657 |
| 5,067,282 | 11/1991 | Netzel | 51/165.77 |
| 5,144,773 | 9/1992 | Flores et al. | 451/8 |
| 5,249,033 | 9/1993 | Maxey | 356/363 |
| 5,433,650 | 7/1995 | Winebarger | 451/287 |

OTHER PUBLICATIONS

FAST! V/A1, Operations Manual for fringe analysis, Apr. 1990; Phase Shift Technology, Inc., 2601 North Campbell Avenue, Suite 101, Tucson, Arizona 85719.

Annual Lapping of Precision Optical Flatware, by Cooke, Brown, and Prochnow. Preprint No. UCRL—78321, dated Jun. 16, 1976 pub. by Laurence Livermore Laboratory, Livermore, CA.

*Primary Examiner*—D. S. Meislin
*Assistant Examiner*—Derris H. Banks
*Attorney, Agent, or Firm*—Svetlana Z. Short

[57] ABSTRACT

A method for interferometrically determining error continuously in the radius of curvature of a planetary polishing surface and for providing compensating correction of the surface shape while the polishing machine is in operation. A conditioner glass body disposed on the polishing surface for reshaping the surface is itself a Fizeau cavity having upper and lower partially-reflective surfaces which are parallel or slightly non-parallel for plano polishing and spherical polishing. The conditioner is illuminated by a plano, monochromatic, coherent light wavefront substantially perpendicular to the polishing surface, preferably over the entire upper surface of the conditioner. A portion of the incident wavefront is reflected from the upper surface as a reference wavefront, and another portion of the incident wavefront is reflected from the lower surface as a measurement wavefront. The two reflected wavefronts are directed to an electronic camera in which the wavefronts cancel and reinforce to form interference fringes indicative of the curvature of the lower surface of the conditioner.

13 Claims, 2 Drawing Sheets

METHOD AND APPARATUS FOR REALTIME MONITORING AND FEEDBACK CONTROL OF THE SHAPE OF A CONTINUOUS PLANETARY POLISHING SURFACE

BACKGROUND OF THE INVENTION

1. Field of the Invention

The invention relates to machines for lapping optical surfaces, and particularly to planetary or continuous polishing machines, and most particularly the control of the shaping or lapping surface of such machines.

2. Background Art

Planetary grinding or polishing machines (generally called lapping machines herein) are well-known tools for manufacturing plano optical surfaces. A typical machine has a relatively large, circular, horizontal, optically flat lapping surface which is driven about an axis. One or more circular glass blanks, or work pieces, to be shaped or polished are disposed on the lapping surface near its perimeter, with the blank surfaces to be polished facing the lapping surface. The glass blanks have diameters smaller than the radius of the lapping surface and typically are pressed against the lapping surface by their own weight. Each blank is constrained from being carried along by the lapping surface by a stationary apparatus which additionally rotates the blank about its own axis while the lapping surface passes beneath it. A slurry of polishing compound, typically containing cerium oxide, is flowed between the blank and the lapping surface while both are turning about their respective axes, and the relative motion causes the blank to become shaped and polished uniformly in conformance with the lapping surface.

In some applications, the planarity of the blank must first be established. More aggressive slurries may be needed at the beginning to grind the work piece flat before final polishing can occur. Grinding and polishing as used herein can be thought of as opposite ends of a spectrum of aggression in material removal from a blank by the lapping procedure described above.

During lapping of the blank or blanks, the lapping surface may be reshaped by the polishing compound and may require conditioning to maintain its planarity. Typically, a large, heavy glass body, or "conditioner," is polished simultaneously with the work pieces, and is periodically radially positioned to keep the lapping surface flat.

Planetary polishing technology has also been applied to the grinding and polishing of high quality spherical surfaces. The lapping surface, or "table," is provided as a spherical segment which can be either concave or convex as needed, and blanks are then finished as either convex or concave complementary surfaces, respectively.

To produce a work piece having an optical surface with a desired radius of curvature, it is essential that the radius of curvature of the lapping surface be maintained throughout the operation. Typically, a conditioner body is used, as in the plano case, to continuously shape the lapping surface which otherwise becomes progressively erroneous in shape through wear from lapping of the work piece. The conditioner can be moved radially inward or outward on the lapping surface to correct and maintain the radius of curvature, provided that the actual shape of the table and its deviation from ideal are known.

The curvature of the table and requirement for shape correction has heretofore been inferred in at least two ways, both of which require that lapping be interrupted. This reduces the runtime efficiency of the machine. First, the work piece itself can be removed and measured directly. Discrepancies in the table can be inferred from the measurements, and the table can be reshaped by running the table with the conditioner repositioned before the work proceeds further. This is very labor-intensive, time-consuming, hazardous to the work piece, imprecise, and impractical for large glass blanks. Another common approach is to include a small "monitor" blank of glass on the lapping surface in one of the regular work stations, where blanks may be located for lapping during operation of the machine, or in a monitor station. The monitor is removed and checked periodically for surface error, from which the surface error of the table is inferred. This control method has at least three drawbacks. First, the monitor may occupy work space and thus reduces productivity of the machine. Second, the monitor is typically much smaller than the work piece, as when planetary polishing is scaled up for production of large precision optical elements such as mirrors or lenses having diameters larger than, for example, one meter. For such large elements, measurement and control of the radius of curvature of the grinding or polishing surface, and hence of the work piece, becomes progressively less accurate, since the accuracy of measurement of curvature of the monitor is proportional to the square of its diameter. The use of a large (full-scale) monitor to improve measurement accuracy would further reduce the amount of polishing table surface available for production. Third, the time delay required for removing and evaluating the monitor off-line can cause loss of control of the table curvature as lapping continues during evaluation. If lapping is suspended, however, productivity is affected.

SUMMARY OF THE INVENTION

It is a principal object of the invention to provide an improved method of control of a planetary polishing surface which results in improved accuracy of lapping of plano and spherical optics.

It is a further object of the invention to provide a method for realtime, online control of a planetary polishing surface.

It is a still further object of the invention to provide an improved method of control of a planetary polishing surface which increases productivity of the polishing machine by eliminating the requirement for a monitor.

It is a still further object of the invention to provide an improved method of control of a planetary polishing surface in grinding and polishing very large optical work pieces.

Briefly described, a method in accordance with the invention uses interferometry, in which the conditioner glass body is itself a interferometric cavity, to measure continuously during operation the radius of curvature of the lower surface of the conditioner and to activate a realtime feedback system which analyzes the curvature of the conditioner and automatically repositions the conditioner radially on the polishing table to correct work-induced errors in the radius of curvature of the polishing table and to restore thereby the proper radius of curvature in the table.

In accordance with a presently preferred embodiment of the invention, a monochromatic, coherent light source is collimated to illuminate substantially the entire upper surface of the conditioner ("full aperture" illumination) substantially perpendicular to the lapping surface. The upper surface being highly polished and partially reflective, and the conditioner being transparent, the space within the conditioner between the upper and lower surfaces thereof defines a Fizeau interferometer cavity. The light wavefront reflected from the upper surface becomes the reference wavefront, and the wavefront reflected from the lower surface within the cavity becomes the measurement wavefront. Interference fringes or rings are formed by phase cancellation or reinforcement of the reflected measurement and reference wavefronts. The upper and lower surfaces preferably are provided as slightly non-parallel to ensure that a thickness gradient and hence an unequal length optical path exists within the Fizeau cavity to provide interference fringes for analysis. The pattern of fringes is characteristic for a particular angle of non-parallelism, or "wedge," in the conditioner for plano optics, and for a radius of curvature of the lower surface in spherical optics. The upper and lower surfaces can be made parallel, resulting with interference rings representing the curvature of the lower surface. The pattern of fringes or rings is captured and digitized by a CCD camera coupled to a commercially-available fringe analyzer which calculates the power in the interferogram, compares it to a desired value, and thereby detects subtle changes in curvature of the conditioner and, hence, of the table. The fringe analysis system generates an output signal (an error signal representing changes from the desired value) for controlling an actuator, for example, a lead screw driven by a servo motor, to displace the conditioner radially toward or away from the axis of the polishing table in order to alter the table surface and thereby re-establish the proper radius of curvature. Values of the radius can be positive (table surface convex upward), negative (table surface concave (upward), or zero (table surface planar).

BRIEF DESCRIPTION OF THE DRAWINGS

The foregoing and other objects, features, and advantages of the invention, as well as a presently preferred embodiment thereof, will become more apparent from a reading of the following description in connection with the accompanying drawings in which.

DESCRIPTION OF THE PREFERRED EMBODIMENT

Figure 1:
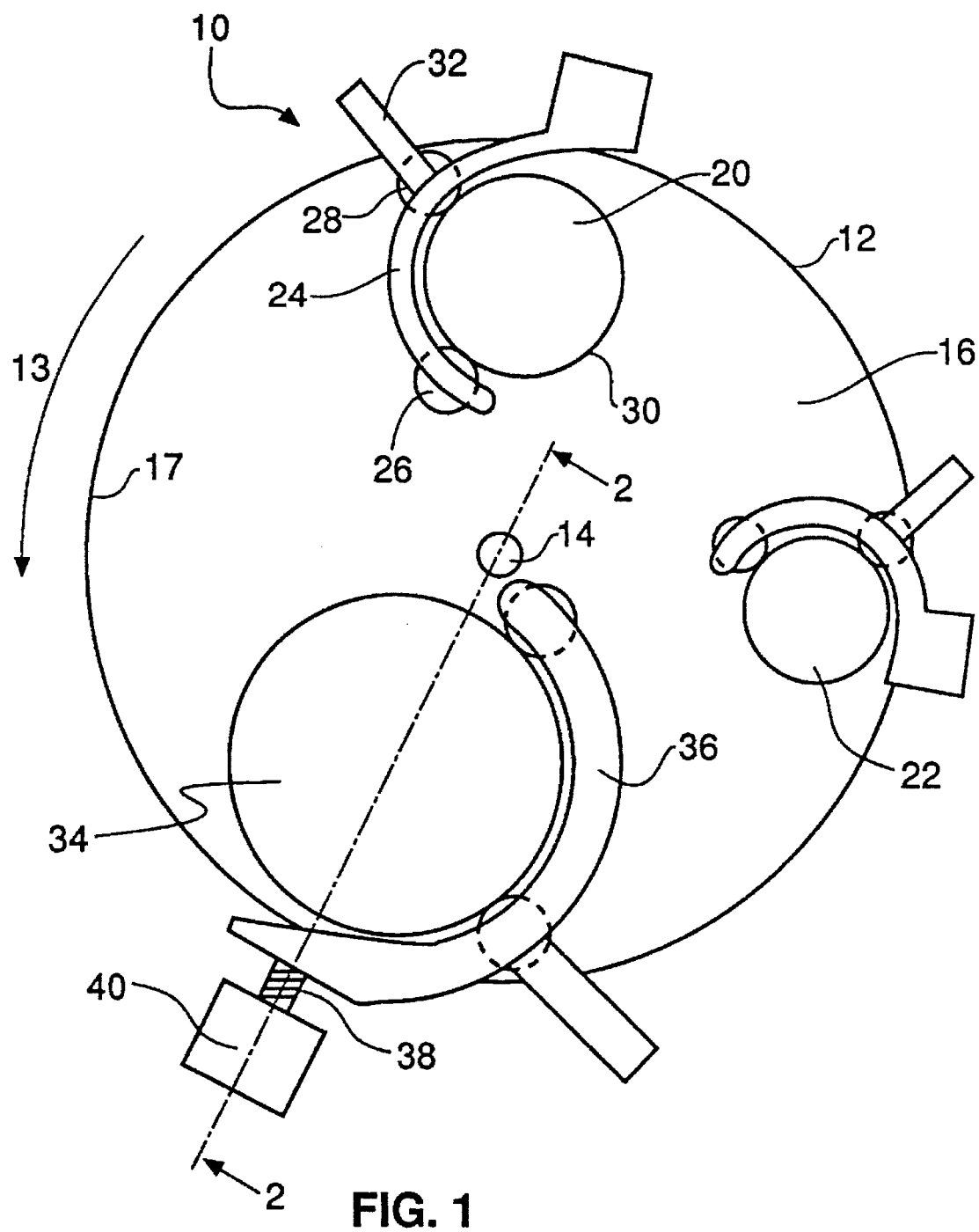
FIG. 1 is a plan view of a conventional continuous planetary lapping machine, showing two work pieces and a conditioner being lapped.
Figure 2:
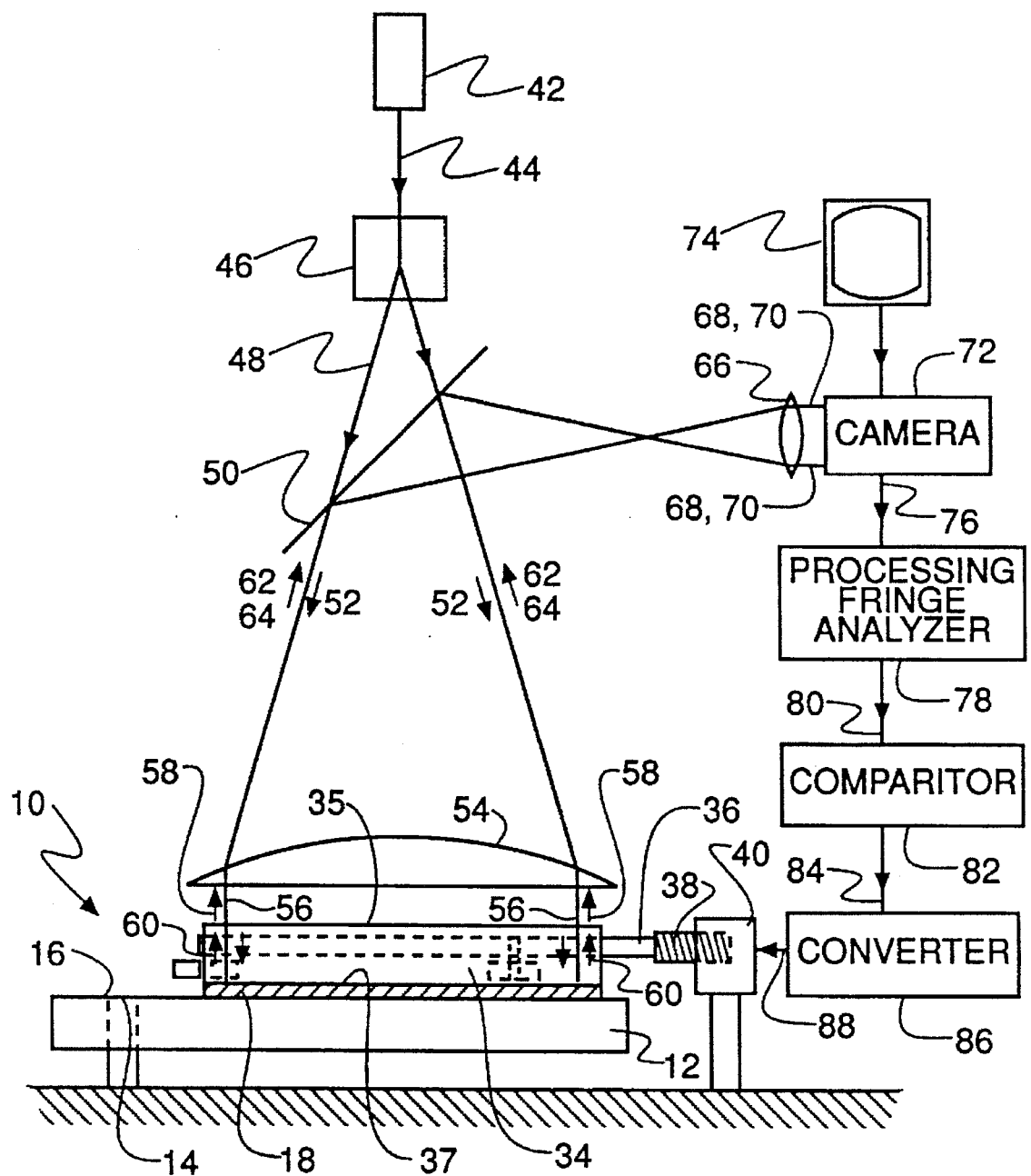
FIG. 2 is a schematic partial cross-section of the lapping machine of FIG. 1 taken along line 2—2, showing additional surface shape control elements in accordance with the invention.

Referring to FIGS. 1 and 2, there is shown a portion of a continuous planar polishing, or lapping, machine 10. Lapping table 12 is typically circular and horizontal and is adapted to be rotationally driven 13 (means not shown) about its axis 14. During operation, the upper, or lapping, surface 16 of table 12 is provided with a slurry 18 of abrasive material, typically cerium oxide, which is introduced near the center of surface 16 (means not shown) and flows outward therefrom by the action of table rotation. Two circular work pieces 20 and 22 are shown disposed on table 12 while being lapped. Work pieces can be formed from, for example, glass, ceramic, or metal, and may have any desired configuration on their upper surfaces. Optical elements are typically glass. If infrared optics are used, the optical element may be made of Zns or MgF. Piece 20 is restrained from translation with the rotating table 12 by yoke 24, which is fixedly mounted to the machine frame (not shown) and extends inwardly of the table perimeter 17 above surface 16. Yoke 24 is provided on its underside with an idler wheel 26 and a drive wheel 28 which are disposed against the cylindrical sidewall 30 of piece 20. Wheel 28 is driven by motorized gearbox 32, such that piece 20 rotates about its own axis while surface 16 passes beneath. Piece 20 rides on a film of abrasive slurry 18 which abrasively shapes and polishes both surface 16 and the underside of piece 20 to be conformable and to have a mirror-like finish. Piece 22 has similar restraining and rotating apparatus, not identified, adapted in size to the size of piece 22.

Surface 16 is planar when a planar polished work piece is desired, or is spherical, either concave or convex, when a spherically finished work piece surface is needed.

Since surface 16 can become worn unevenly by lapping of the work pieces, a conditioner 34 is provided to maintain the proper radial shape of surface 16. Conditioner 34 is preferably a cylindrical, transparent, optical glass body of uniform axial transmittance and optical index and low coefficient of thermal expansion, substantially heavier and larger in diameter than any of the work pieces. It is disposed on surface 16 and restrained by apparatus similar to that described above for work piece 20, except that restraining yoke 36 is not fixed to the machine frame like yoke 24 but instead is adapted to be moved radially over table 12 as required to move the conditioner to a different radial location to maintain the correct shape of surface 16. Conditioner 34 also rides on a film of slurry. Lapping the broad and heavy conditioner swamps out and corrects surface wear caused by lapping of the smaller, lighter work pieces. Yoke 36 moves in response to an actuator, preferably radial, for example, a lead screw 38 driven by a servo motor 40. The motor can turn in either direction to advance or withdraw screw 38 as directed.

Accurate, realtime information as to the shape of the lapping surface has not heretofore been obtainable in the art but is provided by the subject invention. This permits continuous monitoring of the surface and radial adjustment of the conditioner glass body whereby the radial profile of the lapping surface is continually and accurately maintained at a desired specification.

In accordance with the invention, conditioner 34 is configured to function as a full-aperture Fizeau cavity in an unequal path interferometric system for continuous, realtime, online measurement and feedback control of the shape of the lower surface of the conditioner and, by inference, the immediately adjacent surface of the lapping table. For fringe interference evaluation, the upper surface of the conditioner is polished slightly non-parallel to the lower surface, resulting in enough wedge in the conditioner to produce, preferably, 12–20 interference fringes over the aperture. For ring interference evaluation, the upper surface of conditioner 34 is ground and polished to be substantially parallel with the lower surface. In both cases, the upper surface is partially reflective.

A light source 42, most preferably a laser module, provides coherent, monochromatic, optical energy in a substantially narrow beam 44. A diverger 46 converts beam 44 into first diverging spherical wavefront 48. Part of wavefront 48 is transmitted by partially-reflective beamsplitter 50 to produce second diverging wavefront 52 which first collimating lens 54 converts to plano wavefront 56. The lens 54 may be of larger diameter than the conditioner 34, to accommodate displacement of the conditioner, which usually is no more than a few centimeters. The lens may be mounted on or attached to the conditioner and move therewith. The full aperture of the conditioner (its entire area) is desirably illuminated.

Wavefront 56 encounters the upper surface 35 of conditioner 34 and is partially reflected as reference wavefront 58. Partial reflectance may be provided by the inherent reflectance (about 4%) of the surface 35. The remainder of wavefront 56 passes into and through the Fizeau cavity of the conditioner, is reflected from the lower surface 37 of conditioner 34, and returns through the upper surface as measurement wavefront 60. Plano wavefronts 58 and 60, variably in or out of phase spatially depending upon their previous paths, both return through first collimating lens 54 which converts them into converging spherical wavefronts 62 and 64, respectively. Portions of wavefronts 62 and 64 are reflected by beamsplitter 50 as spherical wavefronts onto second collimating lens 66 which converts them into plano wavefronts 68 and 70, respectively. The interference (cancellation and reinforcement) of wavefronts 68 and 70 forms an interference pattern on the photosensitive elements of an imaging device 72 which can be a solid state camera with, for example, a CCD, CID, MOS, or photodiode array of sensors. The array in imaging device 72 can be a rapidly scanned linear array or a fixed two-dimensional array. An image of the interference pattern can be displayed on a video monitor 74. The imaging device output 76 is directed to an image processing system 78 which can include a computer programmed with an interference fringe analysis program, for example, FAST! V/AI, available from Phase Shift Technology, Inc., Tucson, Ariz. 85719. The radius of curvature of lower surface 37 is calculated and output 80 is directed to comparator 82 which compares the measured power value of the lower surface of the conditioner with an intended reference value in memory and generates an error signal 84 having both sign and magnitude denoting the direction of the radius change required in the curvature of the lapping surface and the amount. Error signal 84 is directed to converter 86 which calculates a new radial location for the rotational axis of the conditioner and directs an error signal 88 of the proper sign, amplitude, and duration to a servo actuator 40 which drives lead screw 92 either clockwise or counter-clockwise, thereby moving conditioner 34 to a new radial location on table 12. For example, for a lapping table which is convex upward, lapping an optical element which is concave downward, the radius of curvature of the table can decrease through wear of the outer portions of the table surface. The conditioner would be moved radially inward, therefore, to generate compensating wear on the inner portions of the table surface, thereby restoring the original radius of curvature of the table.

The all-electric system described is preferred, although some elements such as actuator 90 and lead screw 92 obviously could be replaced by appropriate pneumatic or hydraulic components.

Because the interferometric system uses substantially the full aperture available in conditioner 34, the system is extremely sensitive to very small changes in the shape of lapping surface 16 and can correct them easily, quickly, online, and in real time.

From the foregoing description it will be apparent that there has been provided an improved method for controlling the shape of the lapping surface of a planetary, continuous polishing machine, wherein the lapping table conditioner also functions as a Fizeau cavity in an interferometric system for measurement and feedback control of the lapping surface. Variations and modifications of the herein described method, in accordance with the invention, will undoubtedly suggest themselves to those skilled in this art. Accordingly, the foregoing description should be taken as illustrative and not in a limiting sense.

We claim:

1. A method for controlling the curvature of the lapping surface of a continuous planetary polishing machine having a conditioner comprising a body of glass disposed on the lapping surface, which method comprises the steps of:
   a) illuminating said conditioner body with light directed generally perpendicular to said surface to define an interferometric cavity from which a measurement wavefront and a reference wavefront of said light are returned from said body;
   b) analyzing fringes resulting from interference between said wavefronts; and
   c) adjusting the position of said conditioner body in response to said fringe analysis to correct said curvature of said lapping surface.

2. A method in accordance with claim 1 wherein said lapping surface is planar and said controlled curvature is zero.

3. A method in accordance with claim 1 wherein said lapping surface is a spherical segment.

4. A method in accordance with claim 3 wherein said spherical segment is one of concave upward and concave downward.

5. A method in accordance with claim 1 wherein said conditioner is circular and is caused to rotate about its own axis.

6. A method in accordance with claim 5 wherein said lapping surface and said conditioner are caused to rotate in the same direction.

7. A method in accordance with claim 1 wherein said fringe analysis and said adjusting the position of said conditioner body are performed while said polishing machine is polishing an optical element in addition to said conditioner.

8. A method in accordance with claim 1 wherein said light is monochromatic and coherent.

9. A method in accordance with claim 1 wherein said interferometric cavity is a Fizeau cavity.

10. A method for controlling the curvature of the surface of an optical element while it is being polished on the lapping surface of a rotating table of a continuous planetary polishing machine having a conditioner provided by a glass body having a lower surface and an upper surface, the lower surface being disposed on said lapping surface, and said body being radially movable with respect to said table, said method comprising the steps of:
   a) forming an interferometric cavity of a Fizeau interferometer between said lower and upper surfaces of said conditioner body, said interferometer providing an interference pattern representing the curvature of said lower surface as said conditioner body is lapped;
   b) analyzing said interference pattern; and
   c) displacing said conditioner body radially on said rotating table to correct the curvature of said lapping surface in response to said interference pattern analysis to control the curvature of the surface of an optical element being polished.

11. Apparatus for controlling the curvature of the lapping surface of a continuous planetary polishing machine having a conditioner comprising a body of glass disposed on the lapping surface, same apparatus comprising of:
   a) means for illuminating said conditioner body with light directed generally perpendicular to said surface to define an interferometric cavity from which a measurement wavefront and a reference wavefront of said light are returned from said body;
   b) means for analyzing interference pattern resulting from interference between said wavefronts; and
   c) means for adjusting the position of said conditioner body in real time in response to said interference pattern analysis to correct said curvature of said lapping surface.

12. Apparatus according to claim 11 wherein an interferometer having a source of coherent light and an optical element is provided which includes said cavity.

13. Apparatus according to claim 12 wherein a feed back control system includes said interference pattern analysis means and generates control signal for operating said adjusting means.

* * * * *